T. GAILLARD.
Turn-Buckles.
No. 136,910.    Patented March 18, 1873.
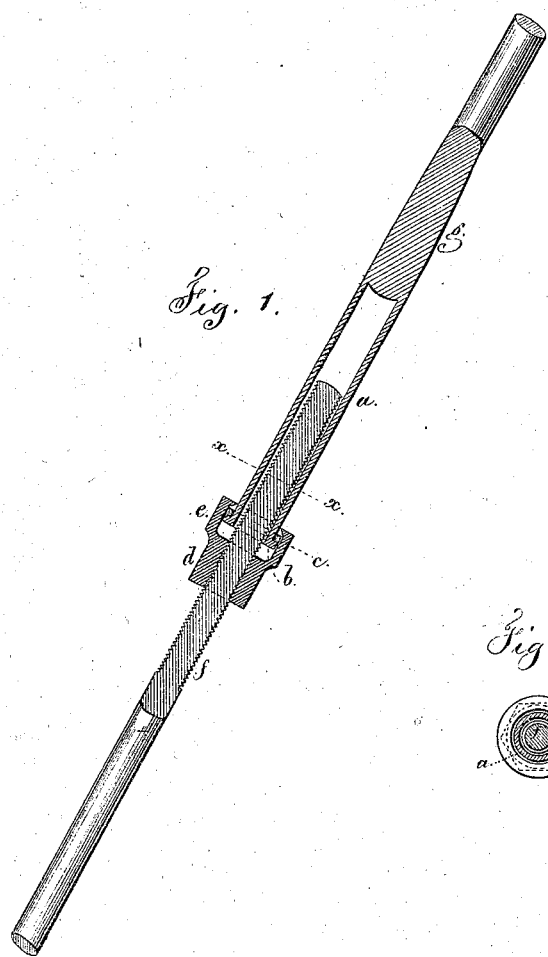
Witnesses
Chas. H. Smith
Geo. T. Pinckney
Inventor
Tacitus Gaillard
Lemuel W. Serrell

UNITED STATES PATENT OFFICE.

TACITUS GAILLARD, OF BROOKLYN, E. D., NEW YORK.

IMPROVEMENT IN TURN-BUCKLES.

Specification forming part of Letters Patent No. 136,910, dated March 18, 1873.

*To all whom it may concern:*

Be it known that I, TACITUS GAILLARD, of Brooklyn, E. D., in the county of Kings and State of New York, have invented an Improvement in Tightening-Screws for Braces, Tie-Rods, &c.; and the following is declared to be a correct description thereof:

Tightening-screws, sometimes called turn-buckles, have been made with two rods extending from a nut to an eye, through which the bolt passes, and the head is between these rods, and the screw portion of the rod also is between the said side rods. In this case, the screw is exposed to atmospheric action, and becomes rusty. In other instances a pipe has extended from the nut to the eye so as to inclose the head of the rod, and also the nut, and this pipe had to be turned in tightening or loosening the screw-rod.

My invention consists in a tubular socket, welded upon the end of one rod, and receiving loosely the end of the other rod where the screw-thread is cut, in combination with a nut that fits the screw-thread of the rod, and is secured by a collar around the said tube, thereby the nut only is revolved. The parts are protected from rust, and the tubular socket can be welded upon the rod more easily than the head, heretofore required in all such tightening-screws or turn-buckles, could be forged and properly shaped.

In the drawing, Figure 1 is a longitudinal section of the said screw-tightener, and Fig. 2 is a cross-section at the line $x\,x$.

The tube $a$ is made with a flanged end, $b$, and around this is a ring, $c$, that is sufficiently loose to turn freely upon such tube $a$, and $d$ is the nut made with a cylindrical extension, $e$, that surrounds the flange $b$ and ring $c$, and the end of this cylinder $e$ is closed or bent over around the ring $c$, so as to secure the same firmly. The screw-thread in the nut $d$ is adapted to fit the screw upon the rod $f$, and the tube $a$ is of a size to freely receive said screw-rod $f$.

It is now to be understood that this tightening device can be made with accuracy and rapidity, and be adapted for attachment to the rod or brace $g$; hence there is great convenience in this tightener, because after the lengths of the rods or braces have been determined the pipe $a$ can be welded upon the rod that does not have the screw-thread, and the parts are ready for use; and it is only necessary to tighten or slacken the parts that the nut $d$ should be revolved by a suitable wrench.

I claim as my invention—

The nut $d$, made with a cylindrical extension, and the ring $c$, in combination with the tube $a$, flange $b$, screw $f$, and rod $g$, substantially as set forth.

Signed by me this 28th day of March, A. D. 1872.

T. GAILLARD.

Witnesses:
GEO. T. PINCKNEY,
CHAS. H. SMITH.